(12) United States Patent
Bates et al.

(10) Patent No.: US 7,219,298 B2
(45) Date of Patent: May 15, 2007

(54) METHOD, SYSTEM, AND PROGRAM FOR VERIFYING NETWORK ADDRESSES INCLUDED IN A FILE

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 09/809,759

(22) Filed: Mar. 15, 2001

(65) Prior Publication Data

US 2002/0133514 A1  Sep. 19, 2002

(51) Int. Cl.
*G06F 15/00* (2006.01)
*G06F 17/00* (2006.01)

(52) U.S. Cl. .............. 715/501.1; 715/513; 709/219; 709/228

(58) Field of Classification Search ............. 715/501.1, 715/513; 709/219, 228
See application file for complete search history.

(56) References Cited

U.S. PATENT DOCUMENTS

| | | | | |
|---|---|---|---|---|
| 5,745,360 A | * | 4/1998 | Leone et al. ................ | 715/513 |
| 5,907,680 A | * | 5/1999 | Nielsen ....................... | 709/228 |
| 5,918,237 A | * | 6/1999 | Montalbano ................. | 715/513 |
| 6,122,647 A | * | 9/2000 | Horowitz et al. ........... | 715/513 |
| 6,332,158 B1 | * | 12/2001 | Risley et al. ................ | 709/219 |
| 6,535,912 B1 | * | 3/2003 | Anupam et al. ............ | 709/229 |
| 6,618,747 B1 | * | 9/2003 | Flynn et al. ................ | 709/206 |
| 2002/0103932 A1 | * | 8/2002 | Bilbrey et al. .............. | 709/245 |

OTHER PUBLICATIONS

Goschka, Karl M et al., Dynamic hyperlink generation for navigation in relational databases, ACM Conference on Hypertext and Hypermedia, 1999, pp. 23-24.*
Microsoft Word 2000, 1999 Microsoft corporation, screenshots from application, pp. 1-4.*

* cited by examiner

*Primary Examiner*—William Bashore
(74) *Attorney, Agent, or Firm*—Konrad Raynes & Victor LLP; David W. Victor (57) ABSTRACT

Provided is a method, system, and program for verifying a network address. A network address included within a file is accessed. At least one context term is provided. Content is accessed at the network address in the file and a determination is made as to whether the accessed content satisfies a qualifying threshold with respect to the at least one context term.

17 Claims, 5 Drawing Sheets

METHOD, SYSTEM, AND PROGRAM FOR VERIFYING NETWORK ADDRESSES INCLUDED IN A FILE

BACKGROUND OF THE INVENTION

1. Field of the Invention

Provided is a method, system, and program for verifying network addresses included in a file.

2. Description of the Related Art

Oftentimes, Internet Web addresses, also known as Universal Resource Locators (URLs), are embedded in hypertext links within an electronic document, such as a Hypertext Markup Language (HTML) page created with a web publishing tool, an e-mail created with an e-mail text editor, and a document created with a word processing document. The person viewing the electronic document may then select the hypertext link to access the page addressed by the URL embedded in the hypertext link. Document authors include hypertext links to provide the reader access to other web pages of interest including related information.

Currently, the accuracy of the URL included in the hypertext link cannot be checked by a spell checker program because the URL itself does not form a recognized English language word, e.g., "www.ibm.com". Moreover, a document author may believe they have included the correct URL in a hypertext link in the document, when in fact the URL they inserted addresses a web page that is different from the one they intended. For instance, the author may insert the URL "www.whitehouse.com" into a document intending to provide a hypertext link to the official United States government Internet Web page for the White House, when in fact the correct official government Web for the White House is "www.whitehouse.gov". The author of the web page may be placed in a compromising situation if the hypertext link included in the document incorrectly references an Internet Web page including content entirely unrelated to the intended Web page or including offensive or objectionable material. For instance, the incorrect URL embedded in the hypertext link may reference a web page including objectionable material, such as profane, pornographic, hateful or otherwise inappropriate content. If the Web page is directed to a sensitive target audience, such as children, business associates, potential customers, etc., then such a mistake could be particularly troublesome.

This same problem may occur if the author is preparing an e-mail to send to business associates or other acquaintances and includes a hypertext link to a URL in the e-mail. The e-mail author would face the same embarrassment and problems discussed above by including a wrong hypertext link to a Web page containing material offensive to the e-mail recipients.

For these reasons, there is a need in the art for an improved electronic file editing tool that assists people in including correct network addresses, such as hypertext links, in the electronic file.

SUMMARY OF THE PREFERRED EMBODIMENTS

Provided is a method, system, and program for verifying a network address. A network address included within a file is accessed. At least one context term is provided. Content is accessed at the network address in the file and a determination is made as to whether the accessed content satisfies a qualifying threshold with respect to the at least one context term.

Further, the network address may comprise a Universal Resource Locator (URL). In such case, accessing the content at the network addresses comprises downloading a file addressed by the URL over the Internet.

Moreover, the network address may be embedded in a hypertext link in the file.

Additionally, the network address may be comprised of a string. In such case, if the accessed content does not satisfy the qualifying threshold, then a determination is made of at least one variation of the sting, wherein a determined variation of the string is capable of comprising a network address at which content is located. For each determined string variation, a request is submitted to access content at the network address comprising the string variation. If content is accessed in response to the submitted request, then a determination is made as to whether the accessed content at the network address comprising the string variation satisfies the qualifying threshold with respect to the at least one context term.

Yet further, if the content accessed from the network address comprising the string variation satisfies the qualifying threshold, then the network address comprising the string variation is added to a list of network addresses. User selection of one of the network addresses on the list may be received to substitute for the network address in the file addressing content that did not satisfy the qualifying threshold.

The described implementations provide a technique for checking the network addresses or URLs in a file or page to determine whether the content addressed by the network address satisfies some threshold This threshold may comprise the content at the network address including a sufficient number of keywords that are in the file or document including the network address. Such determinations provide more robust checking of all the content within a file, including any listed network addresses or hypertext links.

The described implementations may also be used with a viewer program to check whether network addresses included in a file being opened by a viewer program includes content that satisfies a certain threshold, indicating whether the hypertext link is correct.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
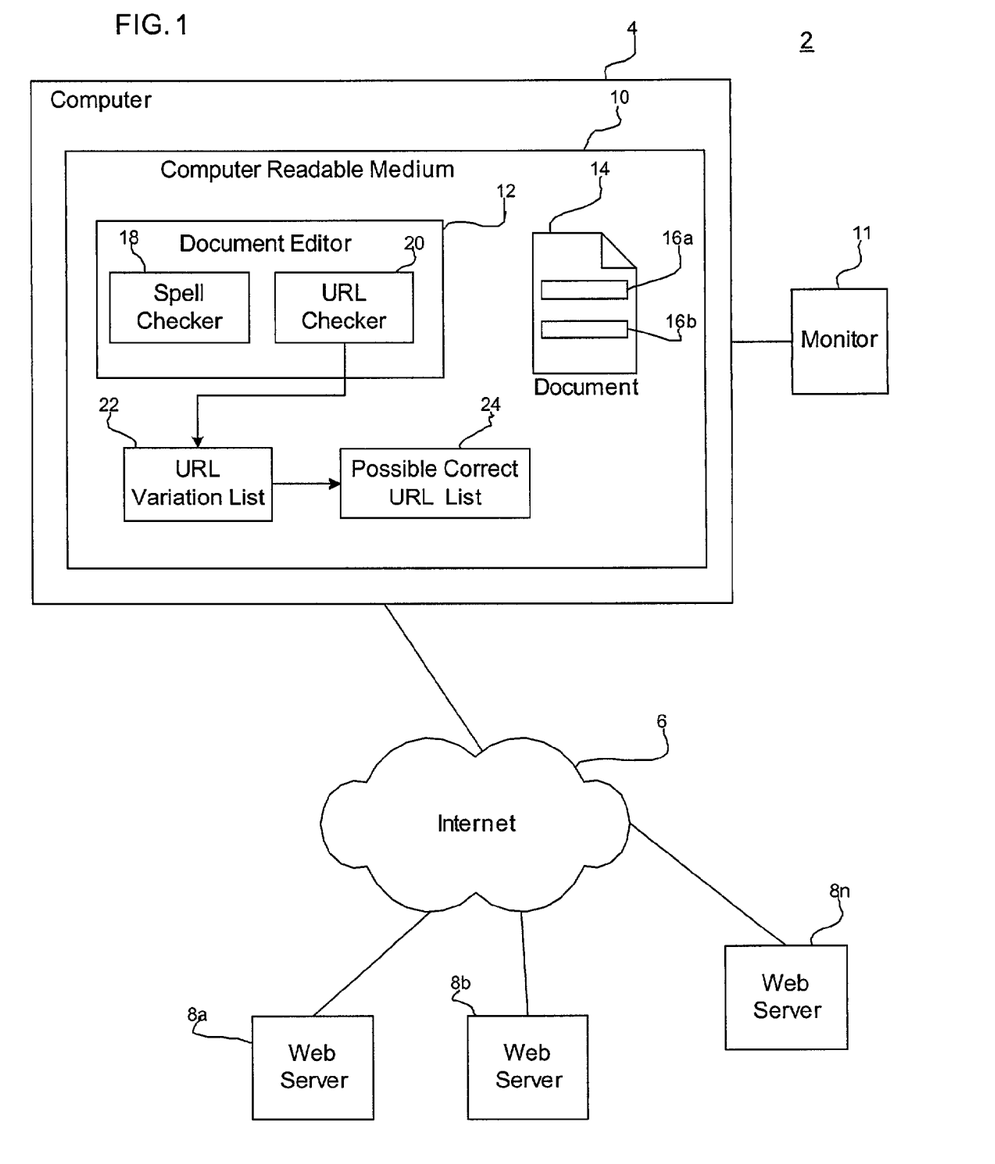
FIG. 1 illustrates a network computing environment in which aspects of the invention are implemented.

FIG. 1 illustrates a network environment 2 in which certain aspects of the invention are implemented. The network environment 2 includes a computer 4, e.g., a personal computer, workstation, server, mainframe, telephony device, handheld device, etc., that is in communication with the Internet 6. The computer 4 is capable of accessing web servers 8a, b, . . . n which provide Internet Web pages in response to Hypertext Transfer Protocol (HTTP) requests, or a request in any other recognized protocol, e.g., File Transfer Protocol (FTP), etc. The computer 4 includes a computer readable medium 10, which may comprise any volatile or non-volatile memory device or storage device known in the art, or some combination thereof. The computer 4 would load programs into the computer readable medium 10 to execute. The computer 4 further includes an attached monitor 11 capable of rendering graphical user interfaces (GUIs) and other information to display.

The computer 4 may load and execute a document editor program 12, which is capable of generating an electronic document 14 including text content and one or more hypertext links 16a, b that reference pages, files or content within one of the web servers 8a, b, . . . n. For instance, the document editor program 12 may be part of a Web publishing tool to generate HTML web pages, part of an e-mail program for composing and sending e-mail messages or part of a word processing program (e.g., Corel WordPerfect, Microsoft Word, Lotus Word Pro, etc.)**

**WordPerfect is a registered trademark of Corel Corportion; Word pro is a registered trademark of lotus Development Corporation.

The document editor program 12 may include a spell checker 18 program that can determine whether text strings in the document 14 match entries in a dictionary of recognized words in a manner known in the art. The document editor program 12 further includes a URL checker 20 that performs hypertext link verification operations in accordance with the described implementations of the invention.

In certain implementations, the URL checker 20 would be utilized to verify the accuracy of hypertext links 16a, b based on context terms within the document 14 being edited. If the URL checker 20 determines that the context terms in a predetermined vicinity of the hypertext link 16a, b, e.g., the same sentence, paragraph, page, etc., are not included at a threshold frequency within the web page referenced by the hypertext link 16a, b, c, then the URL checker 20 assumes that the referenced web page is not the page the author intended. In such event, the URL checker 20 generates a URL variation list 22 including modified URLs that are variations of the URL in the hypertext link 16a, b. For instance, the modified URL in the list may have the same domain name as the URL in the hypertext link, e.g., "whitehouse", but a different top level domain name, e.g., .com (commercial business), .gov (a government agencies), .edu (educational institution), net (network organizations), .ca (Canada), .th (Thailand), etc. Additionally, the URL may include possible different spellings of the domain name, e.g., whitehouse, and/or URLs including domain names that are morphological variations produced by applying a stemming algorithm known in the art to the domain name. From the URL variation list 22, the URL checker program 20 would analyze the web pages referenced by the URLs in the URL variation list 22 to determine whether such web pages also satisfy the qualifying threshold. The URL checker 20 program would then generate a set of possible correct URLs to include in the possible correct URL list 24. The URLs in the possible correct URL list 24 may then be presented to the user to review and select to substitute for the URL in the hypertext link 16a, b the user added into the document.

Figure 2:
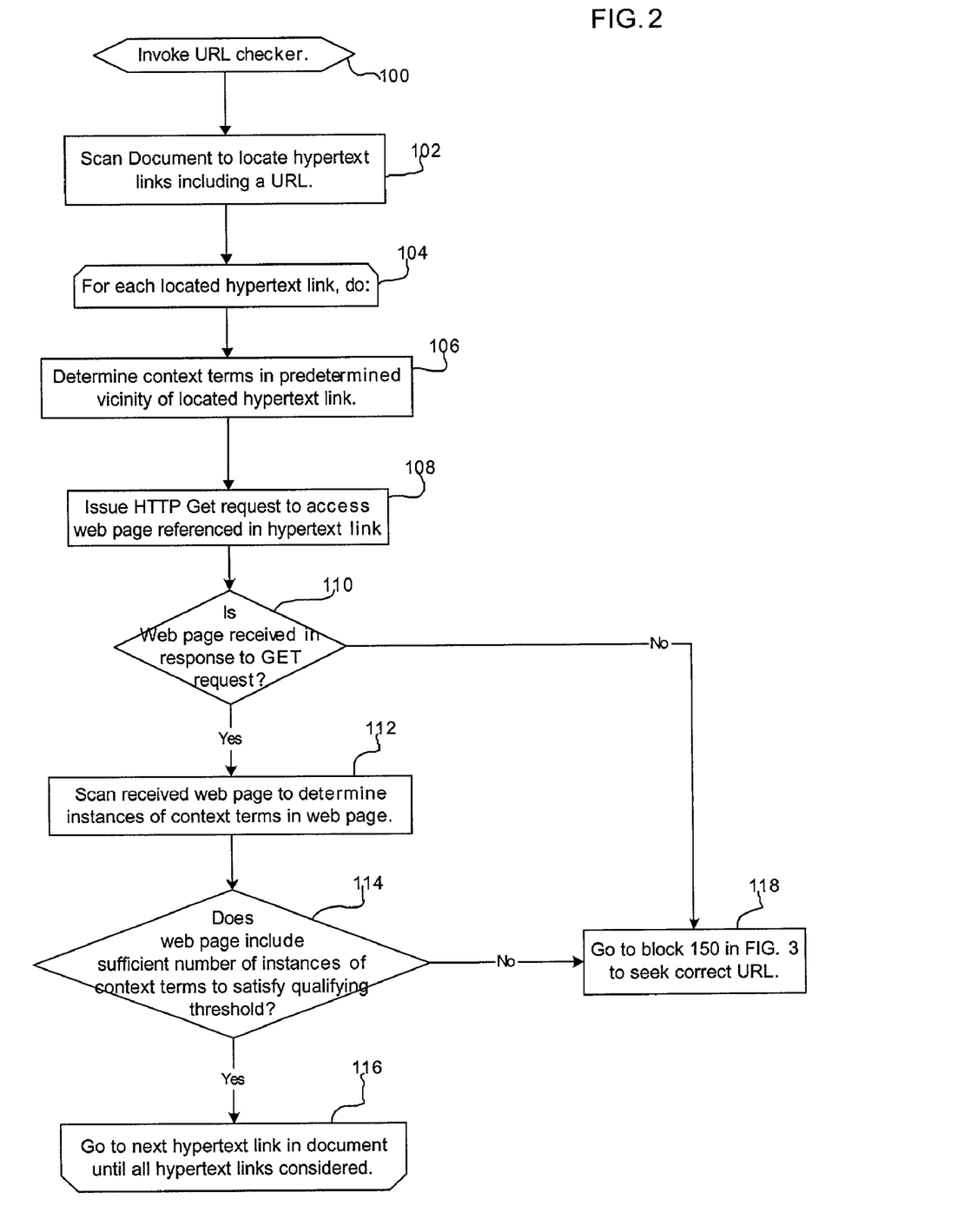
FIGS. 2–4 illustrate logic to verify URLs and other network addresses embedded in hypertext links listed in a document being authored in accordance with implementations of the invention.
Figure 3:
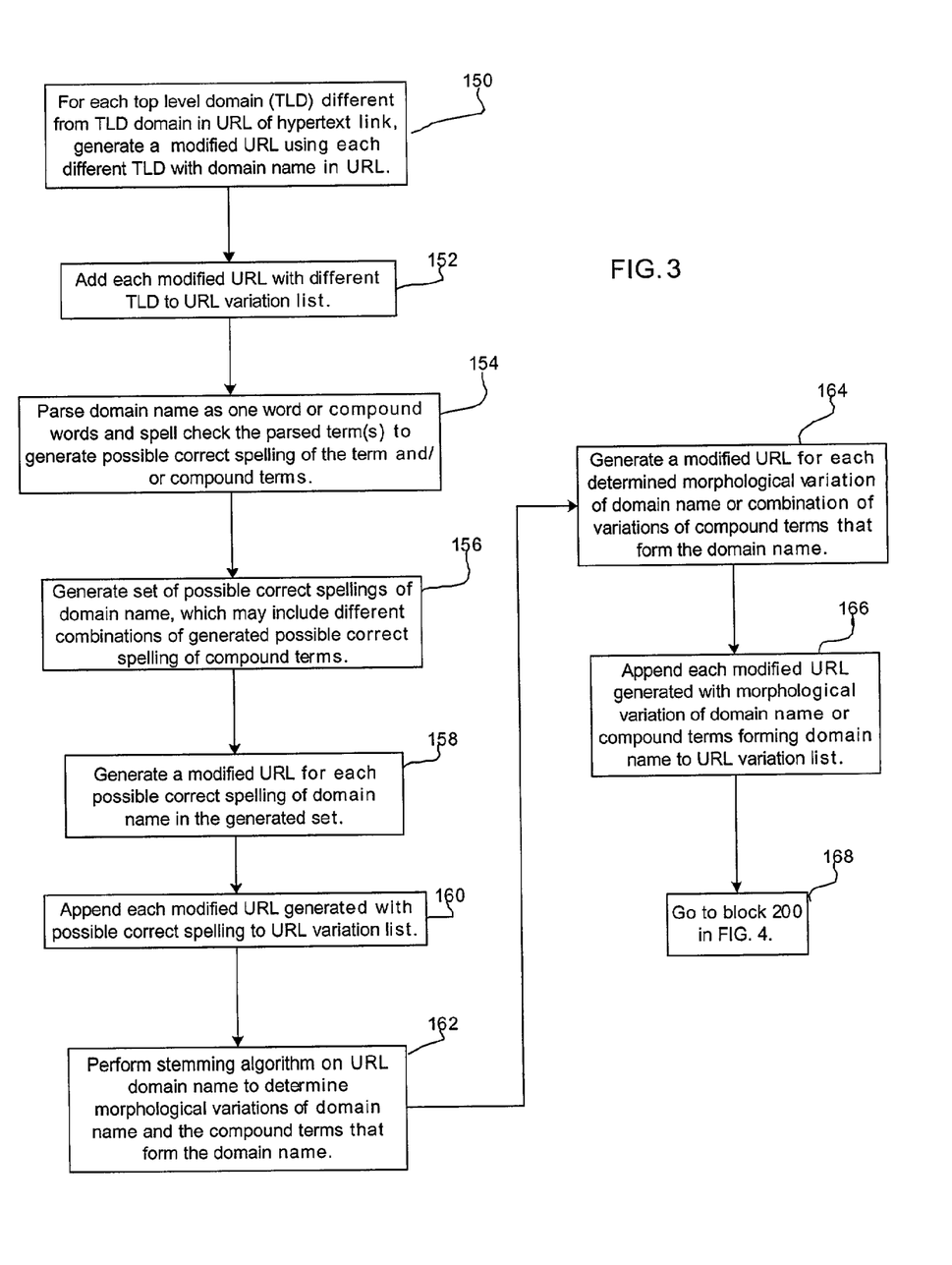
Figure 4:
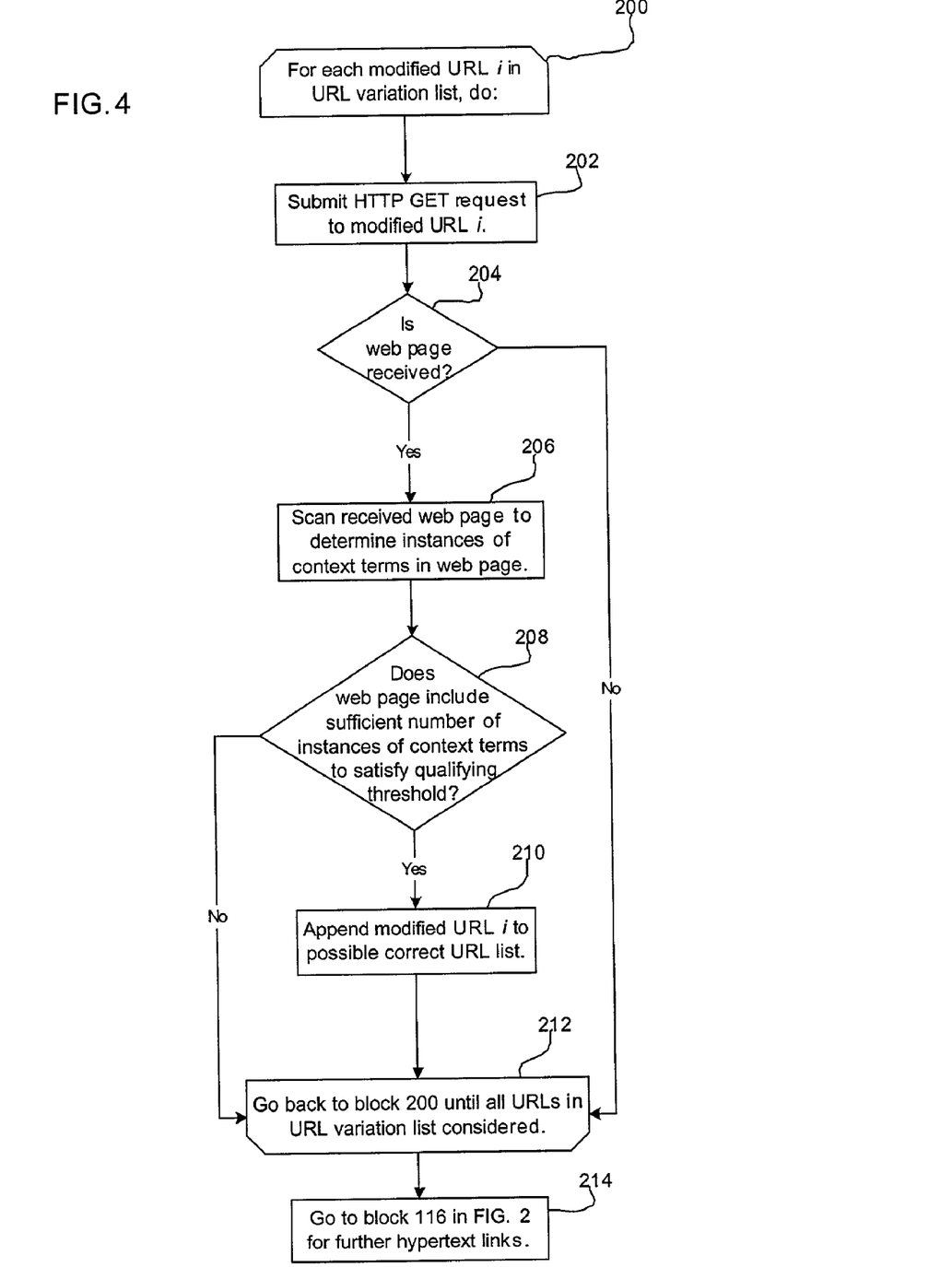

FIGS. 2, 3, and 4 illustrate logic implemented as code in the URL checker 20 to verify the accuracy of hypertext links 16a, b in the document 14 in accordance with certain implementations of the invention. With respect to FIG. 2, control begins at block 100 with the URL checker 20 being invoked. The URL checker 20 may be invoked when the user invokes the spell checker 18, or separately invoked through a user command or user selection of an item from a drop down menu. Still further, the URL checker 20 may be invoked when attempting to make the document 14 available, such as when sending the document 14 as an e-mail transmission or loading the document 14 onto a server to make accessible. After being invoked, the URL checker 20 scans (at block 102) the document 14 to locate hypertext links 16a, b including URL addresses. For each located hypertext link 16a, b, the URL checker performs the loop at blocks 104 through 116, which may also include performing blocks 150 through 214.

At block 106, the URL checker 20 determines context terms in a predetermined vicinity of the hypertext link 16a, b being considered. The vicinity searched for context terms may include the current surrounding words, line, paragraph, page, pages, etc. The URL checker 20 then transmits (at block 108) an HTTP GET request to a web server 8a, b, c, to access the web page referenced in the hypertext link 16a, b. If (at block 110) the web page is received in response to the GET request, then the URL checker 20 scans (at block 112) the received web page to determine instances of context terms in the web page. The URL checker 20 then determines (at block 114) whether the web page includes a sufficient number of instances of context terms to satisfy a predetermined context term threshold or qualifying threshold. For instance, the qualifying threshold may require at least one or more instances of a certain percentage of the context terms. The qualifying threshold determination at block 114 screens pages of the hypertext links to determine whether they are likely the web page the author of the document 14 intended given the context of surrounding terms in the document 14. The premise of the determination at block 114 is that a retrieved web page including instances of context terms less than the qualifying threshold is likely not relevant to the content of the document 14 and, thus, not likely the intended web page.

If (at block 114) the retrieved web page satisfies the qualifying threshold, i.e., includes a number of instances of context terms meeting or exceeding the threshold, then the web page referenced in the hypertext link 16a, b is likely the page the author of the document 14 intended, and control proceeds (at block 116) back to block 106 to consider any further hypertext links 16a, b located in the document 14. If the web page was not received (at block 110), indicating that the URL of the hypertext link may no longer be valid, or if the web page does not satisfy (at block 114) the qualifying threshold, then control proceeds (at block 118) to block 150 in FIG. 3 to attempt to automatically generate a set of possible correct URLs the author intended. The logic of FIGS. 3 and 4 is performed for each hypertext link 16a, b in the document 14 that does not address a valid web page or does not satisfy the qualifying threshold.

With respect to FIG. 3, the URL checker 20 generates (at block 150) modified URLs that each include the domain name in the URL of the hypertext link 16a, b and a top level domain (TLD), e.g., .com, .edu, .gov, etc., that is different than the top level domain embedded in the ULR of the hypertext link 16a, b. Each of these modified URLs including the same domain name and different top level domains are added (at block 152) to the URL variation list 22.

From blocks 154 to 160, the URL checker 20 generates modified URLs based on alternative spellings of the domain name. At block 154, the URL checker 20 calls the spell checker 18 to parse and spell check the URL domain name in the hypertext link 16a, b in a manner known in the spell checking art as a single term and/or as compound words to generate possible correct spellings of the domain name and/or the compound terms that comprise the domain name. A set of possible correct spellings of the domain name is generated (at block 156), which may include different possible correct spellings of the entire domain name or different combinations of the generated correct spellings of the compound terms forming the domain name. The URL checker 20 then generates (at block 158) a modified URL for each possible correct spelling in the generated set and appends (at block 160) the modified URLs to the UTRL variation list 22.

At blocks 162–164, the URL checker 20 generates modified URLs using a stemming algorithm known in the art against the domain name and/or compound terms that comprise the domain name. At block 162, the URL checker 20 executes a stemming algorithm known in the art on the entire domain name and any compound terms that form the domain name. A modified URL is generated (at block 164) for each determined morphological variation of the domain name and/or different combinations of the morphological variations of the compound terms that form the domain name. These generated modified URLs including the morphological variations of the entire domain name or its compound terms are than appended (at block 166) to the URL variation list 22. Control then proceeds (at block 168) to block 200 in FIG. 4 to process the URL variation list 22 to determine those modified URLs in the list 22 likely to be the URL the author intended to include in the hypertext link 16a, b.

With respect to FIG. 4, control begins at block 200 where the URL checker 20 performs a loop of steps at blocks 202 through 210 for each modified URL i in the URL variation list 22. At block 202, the URL 20 checker transmits an HTTP GET request to the modified URL i. If (at block 204) the requested web page is received, then the URL checker 20 scans (at block 206) the received web page to determine instances of the context terms, previously determined at block 106 in FIG. 2, in the received web page. If (at block 208) the scanned web page does include a sufficient number of instances of context terms to satisfy the qualifying threshold, which is the same determination made at block 114 in FIG. 2, then the modified URL i is appended (at block 210) to the possible correct URL list 24. In additional implementations, the qualifying thresholds at block 208 applied to modified URLs and URLs embedded in hypertext links 16a, b at block 114 may be different. After appending the URL i to the possible correct URL list 24 or failing to qualify the web page addressed by the modified URL i at blocks 204 or 208, control proceeds (at block 212) back to block 200 to consider the next modified URL i in the URL variation list 22 until all modified URLs are considered. Upon completing the possible correct URL list 24, control proceeds (at block 214) to block 116 in FIG. 2 to consider any further hypertext links 16a, b in the document 14.

The possible correct URL list 24 resulting from the process in FIGS. 3 and 4 includes all URLs determined from the actual URL in the hypertext link 16a, b that address web pages that satisfy the qualifying threshold criteria that disqualified the URL in the hypertext link 16a, b. The URL checker 20 would generate a URL list 22 and possible correct URL list 24 for each URL in hypertext links 16a, b that does not include a sufficient number of instances of context terms to satisfy the qualifying threshold. In certain implementations, if a possible correct URL list 24 generated for a hypertext link 16a, b does not include any modified URLs, then no modified URL could be generated according to the logic of FIGS. 3 and 4 that satisfies the qualifying threshold.

Figure 5:
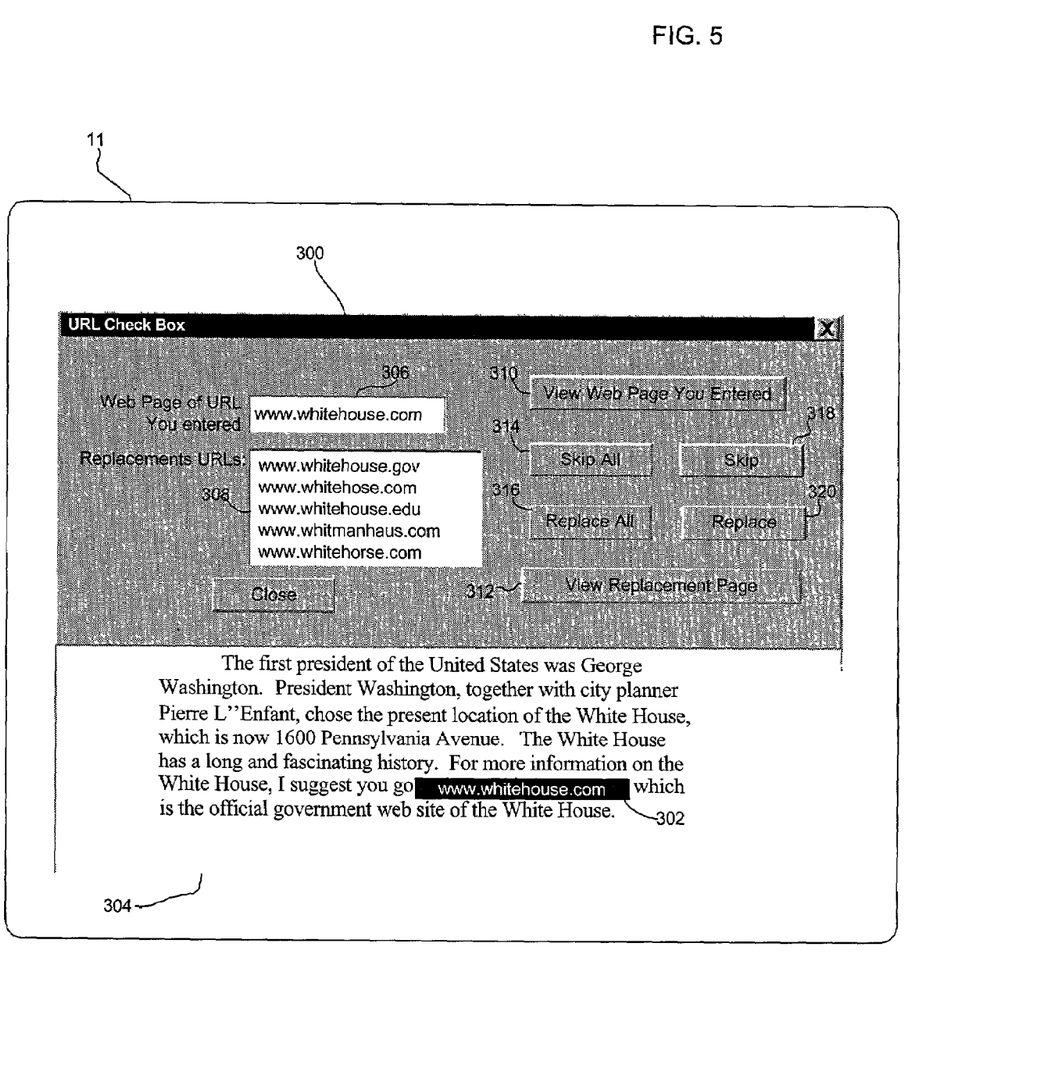
FIG. 5 illustrates a Graphical User Interface (GUI) to allow checking and substitution of hypertext links in accordance with implementations of the invention.

FIG. 5 illustrates a graphical user interface (GUI) 300 the URL checker 20 may generate on the monitor 11 of the computer 4, named the "URL Check Box". The URL check box 300 would be displayed for each hypertext link 16a, b located in the document. FIG. 5 shows the URL check box 300 displayed for the hypertext link 302 "www.whitehouse-.com" located in the document 304. The located hypertext link 302 is displayed in the box 306 in the check box 300. All the modified URLs in the possible correct URL list 24 generated for the URL in the hypertext link 302 are displayed in the "Replacement URL" box 308. User selection of the "View Web Page You Entered" push button 310 would cause the URL checker 20 to retrieve and display the web page at the hypertext link 302 to view what the author entered into the document 14. User selection of the "View Replacement Page" push button 312 would display the web page at the modified URL the user highlighted or otherwise selected in the Replacement URL box 308. Selection of the "Skip All" push button 314 would cause the URL checker 20 to bypass the current and any future instances of the located hypertext link 302 in the document 304 and selection of the "Replace All" push button 316 would replace all instances of the located hypertext link 302 in the document 304 with the modified URL the user selected in the Replacement URL box 308. Similarly, the skip 318 and replace 320 push buttons skip or replace, respectively, the located instance of the hypertext link 302 for which the URL check box 300 was generated.

In one implementation, the URL checker 20 may scan the document 14 to locate the first hypertext link 16a, generate the possible correct URL list 22 for that hypertext link 16a only, and then display the URL check box 300 for that hypertext link. After the author selects a particular action in the URL check box 300, the URL checker 20 would then locate the next hypertext link 16b in the document 14 and again generate the possible correct URL list 22 and display the URL check box 300 for the next located hypertext link 16b. These actions may then be performed until all hypertext links 16a, b in the document 14 are checked.

The above described implementations provide a technique for automatically checking hypertext links an author included in an electronic document to determine whether the hypertext link references the web page the author intended to include in the document based on the context of the document. This URL checker 20 tool would help avoid the situation where an author inadvertently includes a wrong hypertext link that references web content that is unrelated to the content of the document or, worse, offends the target audience of the document and embarrasses the author in the opinion of the target audience.

Following are some alternative implementations of the invention.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In certain described implementations, the URL checker is invoked in response to the author actively invoking the URL checker or some other checker, such as a spell checker 18. Additionally, the URL checker may be invoked when the author attempts to transmit or load the document to make available to the target audience.

In certain described implementations, the URL checker is invoked to verify network addresses included in a document being edited. Alternatively, the URL checker may be included in a viewer program, such as an Internet web browser or e-mail program, to check URLs when the target audience selects the document to load into the viewer program to render on the display 11 or other output means. In this way, the URL checker would alert the reader to possible incorrect hypertext links and suggest possible correct alternative URLs based on the domain name of the embedded hypertext link and the context of the document.

In the described implementations, the URL checker 20 determined whether the content of the web page addressed by the hypertext link included a threshold number of instances of the context terms. In alternative implementations, the URL checker 20 may examine metadata or metatags associated with the web page. Metatags comprise the keywords associated with an Internet web page that are used by Internet search engines to index and locate web pages in response to queries. The qualifying threshold would then be applied to the metadata or metatags associated with the web page.

In certain described implementations, the context terms were gleaned from the document being edited. Additionally, the author of the document may manually enter specific context terms to use when qualifying web pages.

Still further, the author of the document may provide a list of negative context terms. In such case, if the hypertext link or generated modified URL addressed a document that included such negative context terms at a negative qualifying threshold, then such document would not qualify or satisfy the qualifying threshold. For instance, an author of a web page or e-mail directed to a sensitive audience, e.g., children, business associates, customers, etc., may specify profane and offensive language as negative context terms to enable the URL checker 20 to alert the author of hypertext links embedded in the document that point to web pages including such offensive language. The URL checker 20 would then generate a possible correct URL list 24 that would include alternative URLs that are free of such offensive material as specified in the negative context terms. Moreover, the URL checker 20 may provide a predefined list of negative context words including offensive and profane language that the URL checker 20 may reference when qualifying web pages.

The implementations involving the use of negative context terms may be included in an Internet filtering program to screen web pages based on the content of the web pages addressed by the hypertext links in the downloaded web page. Such an Internet filtering program including the URL checker would allow parents, employers or others to block the display of web pages including hypertext links to web pages including a sufficient number of the negative context terms. This would allow the exclusion of pages whose hypertext links include offensive content even if the web page including the hypertext link does not itself include negative context terms.

In the described implementations, the network addresses or URLs being checked were embedded in hypertext links. In alternative implementations, a list of URLs or network addresses in a file may be checked even if such network addresses are not embedded in hypertext links.

The algorithm of FIGS. 2, 3, and 4 described particular steps as occurring in a particular order. However, in alternative implementations, the order of the steps may be changed and certain steps removed and added without departing from the scope of the invention. Moreover, different steps may be performed to execute the overall operation of the algorithm.

The GUI implementation described located hypertext links as being bolded and the term to substitute as being highlighted. Alternatively, the located hypertext links may be indicated in other ways, such as displaying the terms in different colors, different fonts, different font size, etc.

The GUI implementation was described as having particular pushbuttons to cause a particular set of actions to occur. Alternatively, the URL check box GUI may include additional pushbuttons to provide additional functions or combinations of functions described herein.

In the described implementations, the URL checker is used to check URL hypertext links to web pages. Additionally, the URL checker may be provided to check hypertext links including any type of network address known in the art, including non-URL type addresses, and check any type of content available at the network address identified in the hypertext link.

In the described implementations, the URL checker is used to check content on a web page. Additionally, if the URL in the hypertext link addresses content in media formats other than text, such as video, audio, three-dimensional graphics, etc., the URL checker may include the capability to parse and check whether content in such other media formats satisfies the qualifying threshold.

Moreover, the document including the hypertext link that is being processed by the URL checker may be in any document format known in the art, e.g., HTML, Extensible Markup Language (XML), ASCII, bitmap, etc.

In the described implementations, the hypertext links are embedded in a document the author intends to transmit to a target audience. Additionally, the hypertext links being checked may be included in any type of file, regardless of whether the file is to be transmitted to a target audience.

The described implementations involved checking hypertext links in a document. Additionally, the described implementations may be applied to verifying network address that are listed in the document and not embedded in hypertext links.

In the described implementations, the author used a GUI to review and substitute the hypertext links in the document. Additionally, the user may review the possible correct URL list and then manually change selected hypertext links in the document without using the URL check box GUI shown in FIG. 5.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for verifying a network address, comprising:
   accessing a network address included within a file;
   providing at least one context term;
   accessing content at the accessed network address;
   determining whether the accessed content satisfies a qualifying threshold with respect to the at least one context term;
   providing a substitute network address if the accessed content did not satisfy the qualifying threshold, wherein the network address is comprised of a string, and wherein the substitute network address providing includes performing:
      determining at least one variation of the string, wherein a determined variation of the string is capable of comprising a network address at which content is located;
      for each determined string variation, performing:
      (i) submitting a request to access content at the network address comprising the string variation; and
      (ii) if content is accessed in response to the submitted request, then determining whether the accessed content at the network address comprising the string variation satisfies the qualifying threshold with respect to the at least one context term;
   receiving user selection of a provided substitute network address; and
   in response to said user selection, substituting within the file the user selected substitute network address for the accessed network address.

2. The method of claim 1, wherein providing the at least one context term comprises:
   locating context terms in the file within a predetermined vicinity of the network address location in the file.

3. The method of claim 1, wherein providing the context term comprises receiving user entered context terms.

4. The method of claim 1, wherein determining whether the accessed content satisfies the qualifying threshold comprises:
   determining whether the accessed content includes a preset number of instances of the context terms, wherein the qualifying threshold is satisfied if the accessed content includes at least the preset number of instances of context terms.

5. The method of claim 1, wherein determining whether the accessed content satisfies the qualifying threshold comprises:
   accessing metadata associated with the accessed content, wherein the metadata describes attributes of the content; and
   determining whether the accessed metadata includes a preset number of instances of the context terms, wherein the qualifying threshold is satisfied if the accessed metadata includes at least the preset number of instances of context terms.

6. The method of claim 1, wherein at least one of the context terms comprises a negative context term and wherein determining whether the accessed content satisfies the qualifying threshold further comprises:
   determining whether the accessed content includes a preset number of instances of the negative context terms, wherein the qualifying threshold is not satisfied if the accessed content includes at least the preset number of instances of context terms.

7. The method of claim 1, wherein if the content accessed from the network address comprising the string variation satisfies the qualifying threshold, then adding the network address comprising the string variation to a list of network addresses and wherein the receiving user selection includes:
   receiving user selection of one of the network addresses on the list to substitute for the network address in the file addressing content that did not satisfy the qualifying threshold.

8. A system for verifying a network address, comprising:
   a computer readable medium;
   a file stored in the a device which includes a computer readable medium, wherein the file includes at least one network address;
   means for accessing one network address included within a file;
   means for providing at least one context term;
   means for accessing content at the accessed network address;
   means for determining whether the accessed content satisfies a qualifying threshold with respect to the at least one context term;
   means for providing a substitute network address if the accessed content did not satisfy the qualifying threshold, wherein the network address is comprised of a string, and wherein the substitute network address providing means includes:
      means for determining at least one variation of the string if the accessed content does not satisfy the qualifying threshold, wherein a determined variation of the string is capable of comprising a network address at which content is located; and
      means for, for each determined string variation, performing:
      (i) submitting a request to access content at the network address comprising the string variation; and
      (ii) if content is accessed in response to the submitted request, then determining whether the accessed content at the network address comprising the string variation satisfies the qualifying threshold with respect to the at least one context term;
   means for receiving user selection of a provided substitute network address; and
   means for, in response to said user selection, substituting within the file the user selected substitute network address for the accessed network address.

9. The system of claim 8, wherein the means for providing the at least one context term performs:
   locating context terms in the file within a predetermined vicinity of the network address location in the file.

10. The system of claim 8, wherein the means for determining whether the accessed content satisfies the qualifying threshold performs:
    determining whether the accessed content includes a preset number of instances of the context terms, wherein the qualifying threshold is satisfied if the accessed content includes at least the preset number of instances of context terms.

11. The system of claim 8, wherein the means for determining whether the accessed content satisfies the qualifying threshold performs:
   accessing metadata associated with the accessed content, wherein the metadata describes attributes of the content; and
   determining whether the accessed metadata includes a preset number of instances of the context terms, wherein the qualifying threshold is satisfied if the accessed metadata includes at least the preset number of instances of context terms.

12. The system of claim 8, wherein at least one of the context terms comprises a negative context term and wherein the means for determining whether the accessed content satisfies the qualifying threshold further performs:
   determining whether the accessed content includes a preset number of instances of the negative context terms, wherein the qualifying threshold is not satisfied if the accessed content includes at least the preset number of instances of context terms.

13. The system of claim 8, further comprising:
   means for searching for additional network addresses in the file to determine if the additional network addresses satisfy the qualifying threshold if the accessed content satisfies the qualifying threshold.

14. The system of claim 8, further comprising means for adding the network address comprising the string variation to a list of network addresses if the content accessed from the network address comprising the string variation satisfies the qualifying threshold and wherein the receiving user selection means includes:
   means for receiving user selection of one of the network addresses on the list to substitute for the network address in the file addressing content that did not satisfy the qualifying threshold.

15. An article of manufacture comprising a device implementing code for use in verifying a network address by:
   accessing a network address included within a file;
   providing at least one context term;
   accessing content at the accessed network address;
   determining whether the accessed content satisfies a qualifying threshold with respect to the at least one context term;
   providing a substitute network address if the accessed content did not satisfy the qualifying threshold, wherein the network address is comprised of a string, and wherein the substitute network address providing includes performing:
   determining at least one variation of the string, wherein a determined variation of the string is capable of comprising a network address at which content is located;
   for each determined string variation, performing:
   (i) submitting a request to access content at the network address comprising the string variation; and
   (ii) if content is accessed in response to the submitted request, then determining whether the accessed content at the network address comprising the string variation satisfies the qualifying threshold with respect to the at least one context term;
   receiving user selection of a provided substitute network address; and
   in response to said user selection, substituting within the file the user selected substitute network address for the accessed network address.

16. The article of manufacture of claim 15, wherein determining whether the accessed content satisfies the qualifying threshold comprises:
   determining whether the accessed content includes a preset number of instances of the context terms, wherein the qualifying threshold is satisfied if the accessed content includes at least the preset number of instances of context terms.

17. The article of manufacture of claim 15, wherein determining whether the accessed content satisfies the qualifying threshold comprises:
   accessing metadata associated with the accessed content, wherein the metadata describes attributes of the content; and
   determining whether the accessed metadata includes a preset number of instances of the context terms, wherein the qualifying threshold is satisfied if the accessed metadata includes at least the preset number of instances of context terms; and
   wherein at least one of the context terms comprises a negative context term and wherein determining whether the accessed content satisfies the qualifying threshold further comprises:
   determining whether the accessed content includes a preset number of instances of the negative context terms, wherein the qualifying threshold is not satisfied if the accessed content includes at least the preset number of instances of context terms.

* * * * *